United States Patent [19]

Niznik

[11] 4,174,432
[45] Nov. 13, 1979

[54] FLAME RETARDANT RIGID THERMOPLASTIC FOAMS

[75] Inventor: George E. Niznik, Lanesboro, Mass.

[73] Assignee: General Electric Company, Schenectady, N.Y.

[21] Appl. No.: 10,496

[22] Filed: Feb. 8, 1979

Related U.S. Application Data

[63] Continuation-in-part of Ser. No. 908,553, May 22, 1978, which is a continuation-in-part of Ser. No. 669,027, Mar. 22, 1976, abandoned.

[51] Int. Cl.$^2$ .............................. C08J 9/08; C08J 9/10
[52] U.S. Cl. ................. 521/180; 260/37 PC; 521/90; 521/95; 521/128; 521/130; 521/134; 521/138; 521/139
[58] Field of Search ............................... 526/180, 134

[56] References Cited

U.S. PATENT DOCUMENTS

| | | | |
|---|---|---|---|
| 3,779,954 | 12/1973 | Wirth et al. | 521/136 |
| 3,781,233 | 12/1973 | Muller et al. | 521/134 |

OTHER PUBLICATIONS

Porejko et al., "Synthesis & Properties of Polycarbonates with Chlorobisphenols", Polinary 13 (2) 55 (1968).
"Synthesis of Polycarbonates by Interfacial Method", Z. Nolkowski et al., Polinary, 15 (1), 12–14 (1970).
Z. Wielogosy et al., "Infrared Spechoscopic Investigation of Polycarbonates", Plaste und Kautschuk, 19 (12), 902-904 (1972).

*Primary Examiner*—Morton Foelak
*Attorney, Agent, or Firm*—William A. Teoli; Joseph T. Cohen; Leo I. MaLossi

[57] ABSTRACT

Shaped flame retardant rigid thermoplastic foams are provided having high impact strength and superior smoke density and superior radiant panel test values. Blends of dichloroethylene bisphenol polycarbonate and a high performance thermoplastic polymer, such as isopropylidene bisphenol polycarbonate are injection foam molded under melt conditions to a variety of shaped structures.

8 Claims, No Drawings

FLAME RETARDANT RIGID THERMOPLASTIC FOAMS

This application is a continuation-in-part of my co-pending application Ser. No. 908,553, filed May 22, 1978, which is a continuation-in-part of application Ser. No. 669,027, filed March 22, 1976, now abandoned and assigned to the same assignee as the present invention.

The present invention relates to high performance flame retardant rigid thermoplastic foams having outstanding flame resistance as evidenced by low radiant panel test values. More particularly, the present invention relates to shaped foamed blends of dichloroethylene bisphenol polycarbonate and high performance thermoplastic organic polymer.

Prior to the present invention, rigid thermoplastic foam having high impact strength, such as polycarbonate foam has become recognized by the plastics industry as an attractive material with many valuable uses. High performance rigid thermoplastic foam, for example, is being used as a substitute for many light weight metals, such as aluminum, in the automotive industry for making automobile roof tops and in the electronics industry as housing for electronic components. Rigid thermoplastic foams have become increasingly attractive to the electronic data processing industry as a substitute for metal because of the ease of fabrication of thermoplastic foam parts by conventional injection molding techniques as compared to the fabrication of metal parts which have to be stamped out and machined. Although rigid thermoplastic foam has many attractive features as compared to light weight metal, such as aluminum, because of ease of fabrication, stringent flame retardant requirements have limited the use of high performance rigid thermoplastic foam as housing for certain electronic components, such as computers. A test which has been applied by industry to screen rigid thermoplastic foam based on flammability evaluation, is the radiant panel test ASTM-E-162-67.

In accordance with the test, an increase in the "$I_s$ value" which hereinafter will indicate the radiant panel test value, indicates a reduction in flame retardation. Experience has shown that the flame retardant qualities of thermoplastics often are substantially reduced when the thermoplastic is converted to a rigid cellular foam. As a result, efforts to improve the flame retardant properties of rigid cellular foams have been generally based on the approach of improving the flame retardant properties of the original thermoplastic source material and then converting it to the cellular state. For example, when a bisphenol-A polycarbonate foam panel was evaluated in the above described ASTM test, its "$I_s$ value" was found to be at least twice as great as compared to a bisphenol-A polycarbonate panel of the same thickness. The same result was observed when conventional flame retardant materials were added to the polycarbonate which, in the unfoamed state, produced a satisfactory radiant panel test value. However, when the same polycarbonate formulation was converted to a rigid foam, its "$I_s$ value" was greater than 15 which failed the requirements of the electronic data processing industry as defined by UL Bulletin 484. As a result, the market potential for flame retardant rigid thermoplastic foam has been severly restricted because the foaming process inherently appeared to convert the thermoplastic to an unacceptable flame retardant material even though its strength to weight ratio and ease of fabrication was highly attractive.

The present invention is based on the discovery that certain dichloroethylene bisphenol polycarbonates and blends of such materials with particular high performance thermoplastic polymers can be converted to shaped flame retardant rigid thermoplastic foams exhibiting spectacular flame retardant properties. Suprisingly, the $I_s$ values of these rigid thermoplastic foams are either the same or not significantly greater than the $I_s$ values of the original high performance precursor thermoplastic material used in making such foams.

There is provided by the present invention, shaped flame retardant rigid thermoplastic foams having a density of from 0.5 g/cc to 1.2 g/cc, and a Gardner impact strength of at least 10 ft-lbs, which is the product obtained by the injection foam molding of a melt of a material comprising by weight.

(A) at least about 5% of a thermoplastic polycarbonate having an intrinsic viscosity of at least 0.35 dl/g and consisting essentially of chemically combined units of the formula,

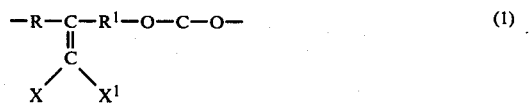

and correspondingly (B) up to about 95% of a thermoplastic polymer selected from the class consistiing of polycarbonate, polyarylene oxide, polyalkylene terephthalate, polyvinylaromatic and polyolefin, where R and $R^1$ are divalent aromatic radicals having from 6–13 carbon atoms, X is a halogen atom, and $X^1$ is selected from X and hydrogen.

Included by R and $R^1$ of formula 1, are for example, phenylene, xylylene, dichlorophenylene, tolylene, naphthalene, etc. Radicals included by X are, for example, chlorine, bromine, etc.; R and $R^1$ and X and $X^1$ can be the same or different radicals respectively.

The polycarbonates consisting essentially of chemically combined units of formula (1) "or haloethylene polycarbonate", can be made by standard procedures involving, for example, the phosgenation of a haloethylene bisphenol of the formula,

where R, $R^1$, X and $X^1$ are as previously defined. The bisphenols of formula (2) can be made by procedures described in S. Porejko and Z. Wielgosz, Polimery, 13, 55 (1968). Preferably, the holoethylene polycarbonate has an intrinsic viscosity in the range of between 0.4 to 0.65 dl/g.

In addition to 1,1-bis(p-hydroxyphenyl)-2,2-dichloroethylene, the haloethylene bisphenols of formula (2) also include

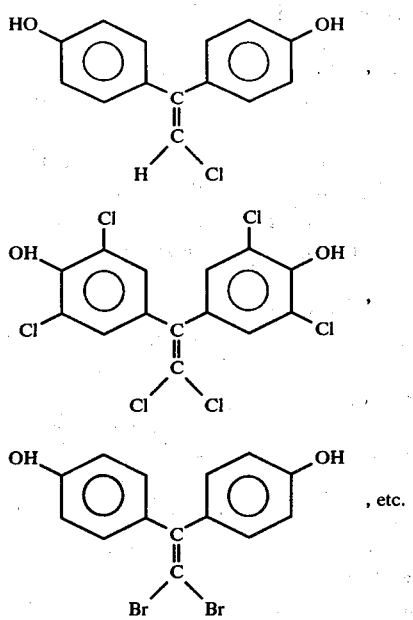

In addition to the above described haloalkylene polycarbonate, and blends thereof with thermoplastic organic material, the flame retardant foams of the present invention also can be made from copolymers by phosgenating mixtures of bisphenols of formula (2) with bisphenols of the formula,

HO—Z—OH,  (3)

where Z is selected from R² and R²—q—R², R² is selected from R radicals and Q is selected from, $$-\underset{\underset{R^3}{|}}{\overset{\overset{R^3}{|}}{C}}-,$$

divalent cycloaliphatic radicals, oxyaryleneoxy radicals, sulfonyl, sulfinyl, oxy, thio, fluorenyl, phenolphthalein and R³ is selected from C$_{(1-8)}$ alkyl, R and halogenated derivatives. Typical of the bisphenols of formula 3 are, for example, 2,2-bis(4-hydroxyphenyl)propane (Bisphenol-A); 2,4-dihydroxydiphenylmethane; bis(2-hydroxyphenyl)methane; bis(4-hydroxyphenyl)methane; 1,1-bis(4-hydroxyphenyl)ethane; 1,2-bis(4-hydroxyphenyl)ethane; 1,1-bis(4-hydroxy-2-chlorophenyl)ethane,; 1,1-bis(2,5-dimethyl-4-hydroxyphenyl)ethane, 1,3-bis(3-methyl-4-hydroxyphenyl)propane; 2,2-bis(3-isopropyl-4-hydroxyphenyl)propane, 2,2-bis(4-hydroxyphenyl) hexylfluoropropane, etc. In addition, 4,4'-sec-butylidenediphenol, 4,4'-methylene(2,6-ditert-butylphenol), 2,2'-methylene(4-methyl-6-tert-butylphenol), bis(4-hydroxyphenyl)phenylmethane, bis(4-hydroxyphenyl)cyclohexyl methane, 1,2-bis(4-hydroxyphenyl)-1,2-diphenyl ethane, etc. In addition to the above bisphenols there are also included within the scope of the dihydroxy compounds of Formula 3 dihydroxybenzenes such as hydroquinone resorcinol, etc., 4,4'-dihydroxydiphenyl, 2,2'-dihydroxydiphenyl, 2,4'-dihydroxydiphenyl, etc.

The "haloalkylene polycarbonate copolymers" can consist essentially of from about 5 mol percent to about 99 mol percent of formula (1) units and from about 1 mol percent to 95 mol percent of units of the formula, $$-\text{OZOCO}-\overset{\overset{O}{\|}}{} \qquad (4)$$

where Z is as previously defined. Phosgenation of the mixture of bisphenols of formulas 2 and 3 can be effected by standard procedures in the presence of an acid acceptor such as calcium oxide, sodium hydroxide, etc.

The haloalkylene polycarbonate of the present invention also can be blended with one or more high performance thermoplastic polymers, such as polycarbonates, for example, polymers derived from phosgenating formula 3 bisphenols, such as bisphenol fluorenone, etc.; polyphenylene oxides, polyalkyleneteraphthalates, for example, polyethyleneteraphthalate, polybutyleneteraphthalate, etc.; polyolefins, for example, polyethylene, polypropylene, ethylene-propylene copolymers, etc.; and high impact polystyrene, etc. Some of these blends are described in Infra-red spectroscopic Investigation of Polycarbonates, Z. Wielgosz, Z. Boranowska and K. Janicka, Plaste und Kautschuk, 19 (12), 902–904 (1972). The blends of the dihaloethylene polycarbonates with the aforementioned themoplastic polymers can be readily achieved by standard melt extrusion techniques preferably a blend of from 30% to 99% of the dihaloethylene polycarbonate is made with from 70% to 1% of polycarbonate. The polycarbonates which can be employed, for example, are 140 grade Lexan polycarbonate of the General Electric Company. In addition blends of the dihaloethylene polycarbonate can be made with General Electric Noryl ® resin, or General Electric PPO ® resin, where there can be utilized from 20% to 95% of the dihaloethylene polycarbonate. In addition, 20% to 95% of the dihaloalkylene polycarbonate can be blended with from 80% to 5% of polyalkylene terephthalate resins, for example, polybutylene terephthalate or polyethylene terephthalate, etc. In addition to the aforementioned thermoplastic polymers, the dihaloalkylene polycarbonates, or blends thereof, can be further blended with from 2% to 60% by weight of glass fiber, and preferably from 4% to 25% by weight of glass fiber based on the total weight of thermoplastic polymer and glass fibers in the blend. In addition to glass fiber, other fillers can be used, such as clay, glass spheres, silica, barium carbonate, silicon carbide of etc.

In the practice of the invention, the dihaloalkylene polycarbonate which hereinafter will signify polycarbonate consisting essentially of units of formula (1), or a mixture of units of formulas (1) and (3), or blends of such dihalo alkylene polycarbonate with other thermoplastic polymers as previously identified, or the blends of such thermoplastic material with a glass fiber and/or other fillers can be blended with a blowing agent by standard procedures in the form of a dry powder, in an extruded pelletized form, in the form of an extruded thermoplastic sheet, etc., based on the melt characteristics of the thermoplastic polymer or blend and the decomposition temperature of the blowing agent. In instances where the decomposition temperature of the blowing agent is below or about the temperature at which the blends with the dihaloalkylene polycarbonate can be melt extruded, it is preferred to make the resulting thermoplastic blend in the form of a dry powder. Blowing agents exhibiting maximum decomposition rates at temperatures at least 25° greater than the melt extrusion temperature of the dihaloalkylene polycarbonate can provide for extrudable foamable blends or concentrates which can be readily pelletized. Preferably, the blowing agents used in making the foams of the present invention are the dihydrooxidiazinones, as taught in my copending application Ser. No. 669,028, filed concurrently herewith and assigned to the same assignee as the present invention. In instances where the foamable blend can be pelletized to concentrates having from about 1% to 25% by weight or more of the blowing agent based on the total weight of blend, it can be further melt extruded with additional dihaloalkylene polycarbonate to make the thermoplastic foam of the present invention.

In addition to the above described dihydrooxidiazinones, other blowing agents which can be used in combination with the dihaloalkylene polycarbonate are, for example, 5-phenyltetrazole and diisopropylhydrazodicarboxylate. In addition to convention blowing agents, foaming of the dihaloalkylene polycarbonate can be achieved by direct use of inert gases, such as nitrogen by a procedure described by Angel U.S. Pat. No. 3,436,446. Injection molding of the dihaloalkylene polycarbonates of the present invention can be performed by standard techniques. The aforementioned blowing agents or other conventional means of blowing to produce shaped foam structures at temperatures in the range of between 470° F. to 650° F. Included by the shaped foam structures having flame retardant properties which can be melt extruded are, for example, computer housing parts, electrical appliances, business machine housings, automobile roof tops, food handling equipment, furniture parts, etc.

In order that those skilled in the art will be better able to practice the invention, the following examples are given by way of illustration and not by way of limitation. All parts are by weight.

EXAMPLE 1

A mixture of 26.25 parts of 1,1-dichloro-2,2-bis(4-hydroxyphenyl)ethylene, 0.026 part of sodium gluconate, 0.237 part of phenol, 0.142 part of triethylamine, 123 parts of methylene chloride and about 75 parts of water is stirred for about 10 minutes at a temperature of about 28° C. There is then added to the mixture, an anqueous sodium hydroxide solution in an amount to adjust the pH of the aqueous phase of the mixture to approximately 10.

While the mixture is being thoroughly agitated, phosgene is introduced at a rate of about 12.24 parts per hour while a 20% aqueous sodium hydroxide solution is added in an amount sufficient to maintain the pH of the aqueous phase of the mixture at 10. Phosgenation of the mixture is continued for about ¾ of an hour under these conditions and then the rate of phosgenation is reduced to about 6.8 parts per hour while maintaining the pH of the aqueous phase to a range of about 11 to 11.5. The phosgenation of the mixture is then continued for about 50 minutes.

The above reaction mixture is then diluted with acternatively 100 parts of methylene chloride, and washed atlernatively with dilute hydrochloric acid, dilute sodium hydroxide and water. The mixture is then centrifuged and filtered and thereafter steam precipitated. There is obtained 26 pounds of product after the precipitate is recovered and dried at 80° C. Based on method of preparation, the product is 1,1-dichloro-2,2-bis(4-hydroxyphenyl)ethylene polycarbonate having an intrinsic viscosity of 0.51 dl/gm in chloroform at 25° C.

The above described dichloroethylene polycarbonate is blended with 5-phenyl-3,6-dihydro-1,3,4-oxidiazin-2-one and glass fiber to produce a blend having 0.5% by weight of blowing agent and 5% by weight of glass fiber. The mixture is then melt extruded into pellets at 500° F.

In accordance with ASTM-E-162-67, 6"×18"×¼" test panels are prepared by foam molding the above blend from the above described pellets at 575° F. This material has a Gardner Impact Value of about 25-37.5 ft-lb, an intrinsic viscosity of 0.34 dl/gm, and a density of about 1.07. Equivalent test panels are also prepared from a blend of the above described dichloroethylene polycarbonate and 5% by weight of glass fiber free of blowing agent. The test panels are then used in evaluating the flame retardant properties of the glass filled dichloroethylene polycarbonate and the rigid foam derived therefrom in accordance with ASTM-E-162-67. It is found that the unfoamed test panel has an $I_s$ value of 0 which is equivalent to asbestos. The foamed panel is found to have an $I_s$ value of 0.8 indicating the foaming of the original dichloroethylene polycarbonate glass fiber blend does not significantly reduce the flame retardant properties of the original blend.

EXAMPLE 2

A blend is prepared of about equal parts by weight of the dichloroethylene polycarbonate of Example 1 and a Bisphenol-A polycarbonate having an intrinsic viscosity of about 0.55 dl/g in chloroform at 25° C., along with 5% by weight of the total of glass fiber and 0.5% by weight of the blowing agent of Example 1. The blend is melt extruded into pellets at 500° F. Pellets are also prepared from the same blend free of blowing agent.

A 6" × 18" test panel is prepared following the procedure of Example 1 by foam molding the blend at 600° F. The foamed blend has an $I_s$ value of 3.9 which is substantially equivalent to the 3.7 value for the unfoamed blend. The foamed blend also has an intrinsic viscosity of about 0.45 dl/g in chloroform at 25° C., a Gardner Impact Value greater than 50 ft-lb and a density of about 1.

EXAMPLE 3

A blend is prepared of 20 parts of the dichloroethylene polycarbonate of Example 1 and 80 parts of the Bisphenol-A polycarbonate of Example 2 along with 5% by weight of the total of glass fiber.

A melt of the above blend is processed at 575° F. in the extruder of a Springfield Cast structural foam molding machine using nitrogen gas at 1500 psig. The melt is injected in about 0.08 sec. in a 6"×18"×¼" cavity maintained at about 200° F. A 75 sec. cycle cool down time is required. There is obtained a 6"×18"×¼" foam test panel having an $I_s$ value of 6 which is substantially the same as the $I_s$ value of the unfoamed blend. The density of the foam is 1.05; it has an intrinsic viscosity of 0.51 and a Gardner Impact of greater than 75.

EXAMPLE 4

A blend of 75 parts of the dichloroethylene polycarbonate of Example 1 and 25 parts of an ABS resin is pelletized at 500° F. with 0.5% by weight of the blend of the blowing agent of Example 1, and 5% by weight of glass fiber.

Test panels are prepared by foam molding the blend at 575° F. A comparison of $I_s$ values between foamed and unfoamed 6" × 18" × ¼" test panels in accordance with ASTM-E-162-67 shows a 12.0 for the unfoamed panel and a 12.5 for the foamed panel.

EXAMPLE 5

A mixture of 1,1-dichloro-2,2-bis(4-hydroxyphenyl)ethylene and 2,2-bis(4-hydroxyphenol)propane (Bisphenol-A) is phosgenated in accordance with the procedures of Example 1. There is used 13.12 parts of the dichloroethylene bisphenol and 10.65 parts of Bisphenol-A. There is obtained a copolymer consisting essentially of chemically combined dichloroethylene bisphenol units and Bisphenol-A units.

The above-described copolymer is pelletized with 5-phenyl-3,6-dihydro-1,3,4-oxadiazin-2-one and glass fiber as in Example 1.

It is found that the $I_s$ value of the unfoamed panel is 3.8 while the foamed panel has an $I_s$ of 4.0.

EXAMPLE 6

In accordance with the procedure of Example 1, foamable polycarbonate-dichloroethylene polycarbonate blends were prepared. Foamable polycarbonate also was prepared in the form of a copolymer consisting essentially of dichloroethylene bisphenol units chemically combined with bisphenol-A units. A foamable polycarbonate also was prepared free of dichloroethylene polycarbonate units. The blowing agent utilized at 0.5% by weight in the respective mixtures was 5-phenyl-3,5-dichloro-1,3,4-oxadiazine-2-one which was incorporated either in the pure state or as a concentrate in one of the polycarbonate components.

In accordance with ASTM-E-162-67, the blends were converted to 5" × 18" × ¼" panels by foam molding at 535° F. Corresponding ⅛" wide unfoamed or "solid" panels free of blowing agent also were prepared. The following results were obtained, where "$I_s$ Values" as previously defined are for the solid and foamed panels, "dichloro" signifies dichloroethylene polycarbonate content, "BPA" signifies bisphenol-A polycarbonate content, which is expressed in percent by weight, based on the total weight of polycarbonate:

| | Is Values | |
|---|---|---|
| dichloro/BPA | Solid | Foam |
| *80/20 | 2 | 2 |
| 20/80 | 22 | 20 |
| 0/100 | 28 | 35 |

*copolymer

The above results show that foaming the dichloroethylene blend or copolymer does not significantly decrease its $I_s$ value. However, in the instance where the polycarbonate free of dichloroethylene polycarbonate was foamed, the $I_s$ value of the resulting polycarbonate foam increased.

In a separate series of tests, following the same general procedure, test panels were also prepared from the dichloroethylene polycarbonate, and a blend of equal parts by weight of the dichloro and BPA polycarbonate. The unexpected results of the present invention were further confirmed with respect to little or no change occurring in $I_s$ value in the foamed panels as compared to the unfoamed panel when the tests were run in accordance with ASTM-E-162-67.

Although the above examples are directed to only a few of the very many shaped foamed articles which can be made in accordance with the practice of the present invention, it should be understood that the materials used in making such foams can vary widely with respect to the nature of the haloethylene polycarbonate, the thermoplastic polymer used in combinatin thereof, or the copolymer having chemically combined units of formula 1 and units of the formula,

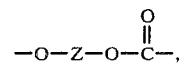

where Z is as previously defined. In addition, the means for converting such thermoplastic material under melt foaming conditions also can vary widely based on the nature of the foaming agent employed, such as an oxadiazinone, inert gas, etc.

What I claim as new and desire to secure by Letters Patent of the United States is:

1. Shaped flame retardant rigid thermoplastic foams having a density of 0.5 g/cc to 1.2 g/cc, and a Gardner Impact Strength of at least 10 ft-lbs, which is the product obtained by injection foam molding the melt of a blend comprising by weight
   (A) from 5–100% of a thermoplastic haloethylene polycarbonate having an intrinsic viscosity of at least 35 dl/g and consisting essentially of chemically combined units of the formula,

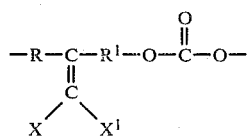

and correspondingly
   (B) from 0–95% of a thermoplastic polycarbonate, where R and $R^1$ are divalent aromatic radicals having from 6–13 carbon atoms, X is a halogen atom and $X^1$ is selected from X and hydrogen.

2. An article in accordance with claim 1, where the polycarbonate of (A) consists essentially of dichloroethylene bisphenol units.

3. An article in accordance with claim 1, where the polycarbonate consists essentially of chemically combined isopropylidine bisphenol units.

4. An article in accordance with claim 1 having up to 60% by weight of glass fiber.

5. An article in accordance with claim 1, comprising up to 100% by weight of haloethylene polycarbonate.

6. Shaped flame retardant rigid thermoplastic foams having a density of from 0.5 g/cc to 1.2 g/cc and a Gardner Impact Strength of at least 10 ft-lbs, which is the product obtained by the injection foam molding of the melt of a thermoplastic copolymer consisting essentially of at least 5 mole percent of haloethylene units of the formula,

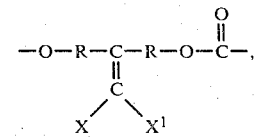

chemically combined with up to 95 mole percent of bisphenol units of the formula,

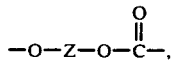

where R and R¹ are divalent aromatic radicals having from 6–13 carbon atoms, X is a halogen atom, X¹ is selected from the class consisting of X and hydrogen and Z is selected from the class consisting of $R^2$ and $R^2-Q-R^2$, $R^2$ is selected from R radicals and Q is selected from the class consisting of,

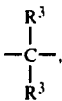

divalent cycloaliphatic radicals, oxyaryleneoxy radicals, sulfonyl, sulfinyl, oxy, thio, fluoroenyl, phenolphthalein and $R^3$ is selected from the class consisting of $C_{(1-8)}$ alkyl, R and halogenated derivatives.

7. An article in accordance with claim 1, where the copolymer consists essentially of chemically combined bisphenol dihaloethylene units and bisphenol isopropylidene units.

8. An article in accordance with claim 6, having up to 50% by weight of glass fiber.

* * * * *